Nov. 29, 1966 W. DONATELLI 3,288,742
BASING OF ELECTRICAL LAMPS AND THE LIKE
Filed Sept. 4, 1962

WALTER DONATELLI
*INVENTOR.*

BY
*Lawrence Burns,*
ATTORNEY 3,288,742
BASING OF ELECTRICAL LAMPS AND THE LIKE
Walter Donatelli, Boston, Mass., assignor to Sylvania Electric Products Inc., a corporation of Delaware
Filed Sept. 4, 1962, Ser. No. 221,030
5 Claims. (Cl. 260—30.4)

This invention relates to the basing of electric lamps, electron tubes, and the like and to a cement suitable for affixing a base to such device.

In basing fluorescent lamps, a cement is generally prepared by mixing suitable proportions of phenolic resins, shellac, rosin, and a filler such as marble flour, with an alcohol such as isopropyl alcohol, to form a putty-like cement. A basing cement of these ingredients is shown, for example, in U.S. Patent 2,141,146 issued December 20, 1938, to R. M. Zabel. This cement is fed to a base filling machine which dispenses the required amount of cement to the proper location in the lamp base. After application the cement remains tacky and putty-like, which requires that each base be individually handled to prevent transfer of wet cement to other bases and to avoid having the cement removed or damaged before use. The bases containing cement cannot be used immediately but must be stored for a short period of time to permit some of the alcohol to evaporate and form a skin on the surface of the cement. Too long a storage period, however, makes the cement too hard and it will not have the right consistency for proper use and the bases must be discarded.

I have discovered that the above disadvantages can be overcome if alpha-trioxymethylene ($OCH_2OCH_2OCH_2$), usually called trioxane, is used instead of alcohol in preparing the cement. The structural formula is

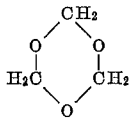

Since trioxane is a solid material at normal room temperature it can be mixed with the other dry ingredients of the cement and stored until needed, with no deterioration, or mixed as liquid trioxane at time of preparing the cement. However, I prefer to mix the ingredients at temperatures between 250° F. to 350° F., at which the trioxane is in the liquid state. Other temperatures above the melting point of 135° F. can be used, however. The cement can then be fed to a reservoir for it on the base filling machine. In order to keep the cement in a plastic state the reservoir is heated by suitable means, such as by an electric jacket, to a temperature at which the trioxane liquefies or at least softens. The filled bases are cooled to the vicinity of room temperature, at which point the cement is no longer plastic since the trioxane solidifies. To use the base it is merely necessary to soften the cement by heating it in any suitable manner, such as by passing the filled bases near an electric heating element.

Because the materials of the cement are all solid at room temperature of about 20° C., yet the cement becomes plastic when heated for application of a base to a lamp or other device, my invention eliminates the need for individual handling of bases, allows them to be fed from hoppers, and permits automatic feeding of filled bases to a machine which threads the lead-in wires from a lamp or other device to the base and which then affixes the base to the device.

In addition, my invention allows the bases to be stored for long periods without deterioration, that is, with good shelf life. Bases filled with the cement of our invention can be kept more than three months without deterioration, whereas the bases containing alcohol could not be kept more than about three days.

Other objects, advantages and features of the invention will be apparent from the following specification taken in connection with the accompanying figures in which.

The resultant cement was then placed in the reservoir of a base-filling machine, and the reservoir kept heated, by placing an electric heating jacket around it, to a temperature at which the trioxane is liquefied or softened and the cement plastic. The base was then filled with cement by the machine and stored until ready for use, the cement meanwhile cooling to room temperature and the trioxane becoming solid. When needed, the filled bases can be heated to liquefy the trioxane and make the cement plastic, and then affixed to a lamp or other device in the manner customary in the art. To achieve a firm bond, the cement is heated to a temperature high enough to cure the resin and vaporize the trioxane while the base is held against the end of the lamps.

Although a specific example of a basing cement mixture has been given, the invention is not limited to the composition of the example. The invention is directed toward eliminating the usual liquid compound of the cement, that is, the isopropyl alcohol or the like, which is liquid and easily vaporizable at room temperature, and using instead a substance which is solid at normal room temperatures but which can be liquefied or softened at an elevated temperature so that the cement will become plastic enough to properly contact the device to which it is applied.

Although, when by itself, that is, not mixed with anything, the trioxane will not liquefy below a temperature of about 145° F., when mixed in the cement, the latter softens and becomes plastic as low as 85° F. This may be due to the trioxane's becoming liquid at a low temperature in the presence of the other ingredients, or to its softening at a temperature below its melting point.

The amount of trioxane used should be enough to make the cement plastic when heated, and we have found between about 11 and 14 liquid pints to about 150 pounds of the dry ingredients of the cement to be satisfactory. If less than 11 pints is used, the cement remains dry in its appearance and action, and above 14 pints is too soft. If the dry ingredients of the cement are different from those above, or are in different proportions, the amount of trioxane required may be somewhat different. Enough should be added to give the cement a plastic condition, but not enough to make it too soft or liquid for application to the desired device.

The material added to the cement to make it plastic when heated should, like trioxane, be capable of being softened or liquefied at a temperature below that necessary to cure the cement during the heating period.

Figure 2:
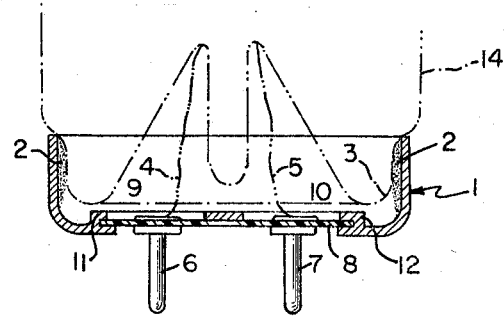
FIG. 2 is a cross-sectional view of the base, filled with cement, with the end of a lamp shown in phantom in its proper position.

As illustrated in FIGURE 2 a lamp base 1 is filled with a ring 2 of the above cement, in position to grasp the end 3 of a glass envelope 14 of a discharge tube such as a fluorescent lamp. The lead-in wires 4, 5 of the lamp are threaded into or affixed to the contact prongs 6, 7, which are fixed to insulating strip 8 by eyelets 9, 10, flattened against the strip 8, which rest on the flanges 11, 12 of the contact prongs 6, 7. The insulating strip 8 is held in the end 13 of the metal shell 13, which carries the ring 2 of cement.

The cement is heated to about 135° F. to become plastic before filling the base 1 with the cement ring 2. The base and cement can then be allowed to cool and stored at about room temperature until the base 1 is to be affixed to the end of lamp envelope 3. The cement is then softened by heating to about 140° F., so that it will be plastic enough to conform to the end 3 of the lamp envelope 14. It is then heated to a higher temperature sufficient to cure the cement and bond it firmly to the end 3 of the lamp envelope 1. The trioxane evaporates on curing.

Figure 1:
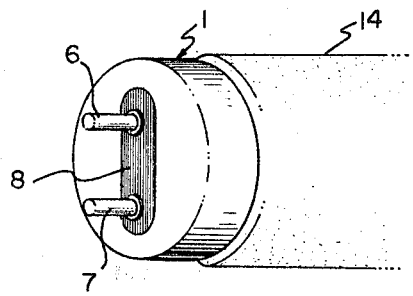
FIG. 1 is a perspective view of a base affixed to the end of a lamp tube.

The finished lamp, with base 1 affixed, is shown in FIG. 1.

What I claim is:

1. A basing cement consisting essentially of a phenolic resin, a filler and trioxane, there being between about 11 and 14 liquid pints of trioxane to about 150 pounds of the dry resin and filler.

2. A lamp base containing a filling of a phenolic basing cement containing trioxane as the sole softening agent.

3. A lamp base consisting essentially of filling of a basing cement containing a phenolic resin, a filler and trioxane, the amount of trioxane present being sufficient to make the cement plastic when heated enough to melt the trioxane.

4. The process of cementing a base to an electric device, said process including placing in said base a quantity of a phenolic cement containing trioxane as the sole softening agent, placing said base on said device, and then heating to vaporize the trioxane and cure the cement, thereby affixing the base to said device.

5. The method of affixing a base to an electric discharge device, said method comprising: mixing a phenolic resin and filler with trioxane as the sole softening agent, the trioxane being present in an amount such as to make the mixture plastic at a temperature that the trioxane is liquid to form a cement; filling the base of an electric device with the cement heated so that the trioxane is in the liquid state to make the cement plastic; then cooling the filled base and storing it at a temperature at which the trioxane is solid, until the base is to be affixed to a device; then heating the cement until it becomes plastic by liquefication of the trioxane; placing said base on said device with the cement in contact with said device; and curing the cement to affix the base to said device.

References Cited by the Examiner

UNITED STATES PATENTS

| 2,141,146 | 12/1938 | Zabel | 200—120 X |
| 2,623,866 | 12/1952 | Twiss et al. | 260—51 |
| 2,827,946 | 3/1958 | Christenson et al. | 260—51 |
| 2,943,011 | 6/1960 | Rayner | 156—335 |

FOREIGN PATENTS 879,597  10/1961  Great Britain.

OTHER REFERENCES

Gould: "Phenolic Resins," Reinhold Publishing Corporation, New York, 1959, page 45.

MORRIS LIEBMAN, *Primary Examiner.*

A. O. DENT, B. A. AMERNICK, *Assistant Examiners.*